June 30, 1936. D. H. MUNRO 2,045,719
INTERNAL COMBUSTION ENGINE
Filed May 27, 1933
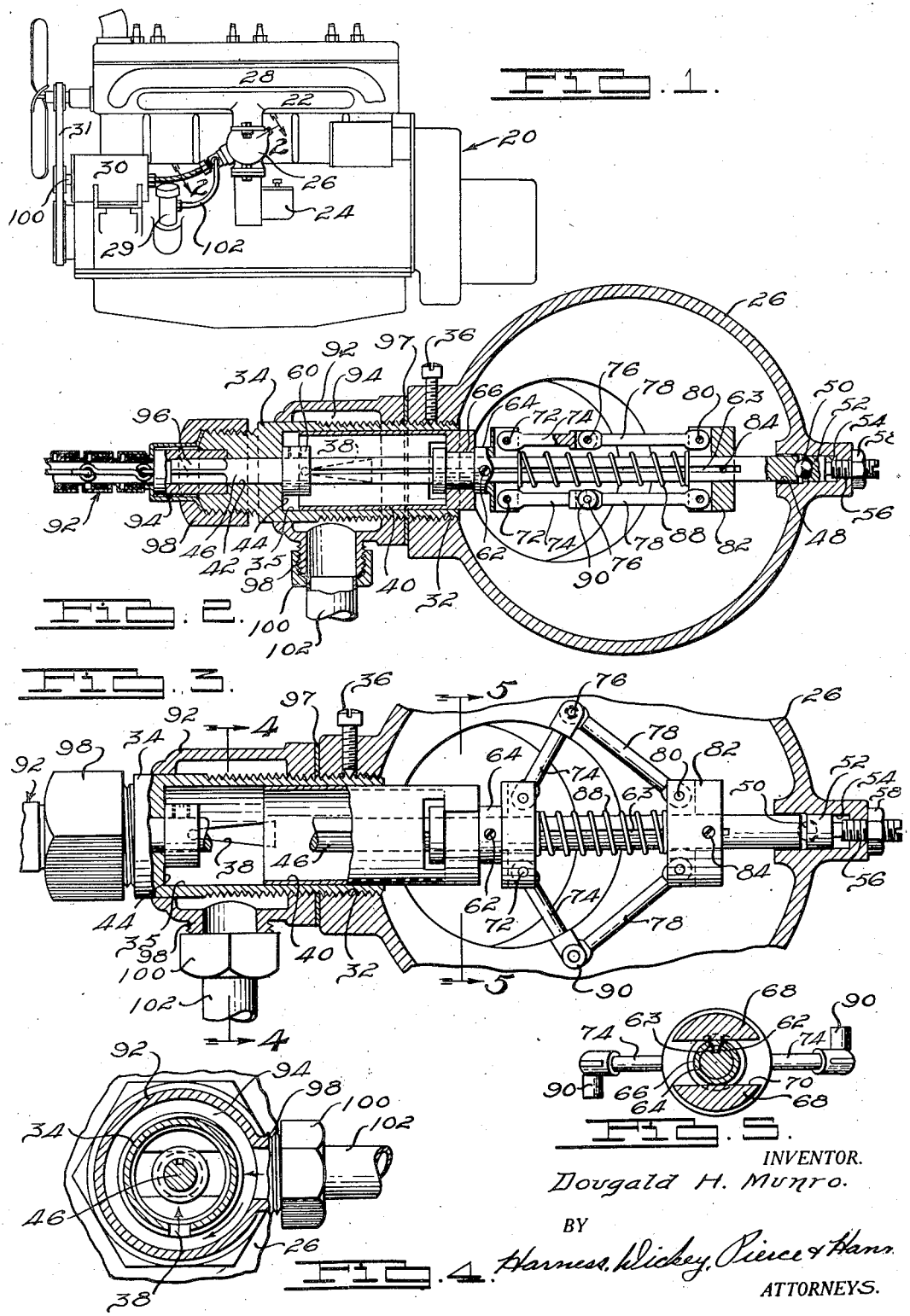
INVENTOR.
Dougald H. Munro.
BY
Harness, Dickey, Pierce & Hans
ATTORNEYS.

Patented June 30, 1936

2,045,719

UNITED STATES PATENT OFFICE 2,045,719

INTERNAL COMBUSTION ENGINE

Dougald H. Munro, Detroit, Mich.

Application May 27, 1933, Serial No. 673,140

4 Claims. (Cl. 123—124)

This invention relates to internal combustion engines and particularly to the fuel induction systems thereof, the principal object being the provision of a new and novel means for automatically controlling the admission of auxiliary air to the fuel induction system to vary the characteristics of the combustible mixture therein.

Other objects include the provision of means for admitting auxiliary air to the fuel induction system of an internal combustion engine in accordance with the requirement of the load and speed of such engine; the provision of means for introducing auxiliary air into the fuel induction system of an internal combustion engine and intimately mixing such air with the fuel mixture passing through such system; the provision of means for introducing auxiliary air into the intake manifold of an internal combustion engine including the provision of a rotating device in the manifold creating a zone of turbulence, and means for introducing auxiliary air into such zone; and the provision of means for introducing auxiliary air into the intake manifold of an internal combustion engine in accordance with the speed of the engine and including a rotatable device within the fuel induction passages of the manifold.

Other objects include the provision of means for feeding metered quantities of gases or vapors from the crank case of an internal combustion engine to the fuel induction passages thereof; the provision of means for drawing off gases and vapors from the crank case of an internal combustion engine and delivering them to the fuel induction system of the engine in accordance with the speed of the engine; and the provision of a passage between the crank case of an internal combustion engine and the fuel induction passages thereof including a centrifugally controlled valve in said connection movable upon variations in the speed of the engine.

Other objects include the provision of means for diluting the normal fuel mixture of an internal combustion engine by feeding to it air drawn from the crank case of said engine in quantities varying in accordance with the speed of the engine; and the provision of means for diluting the normal fuel mixture of an internal combustion engine including a valve controlled air passage in the intake manifold and a centrifugal governor for moving the valve located within the manifold, the auxiliary air passage being connected to the crank case of the engine whereby oil vapor will be drawn into the manifold and will lubricate the wearing surfaces of the centrifugal governor mechanism.

Further objects include the provision of a centrifugal governor and cooperating valve structure having certain novel features of construction; the provision of such a mechanism in which the valve and governor are connected through a floating connection; and the provision of a centrifugal governor and cooperating valve structure that is applicable to and removable from an engine as a unit.

The above being among the objects of the present invention, the same consists of certain features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the several different views, Figure 1 is a more-or-less diagrammatic side elevational view of an internal combustion engine to which a suitable embodiment of the present invention is shown applied.

Fig. 2 is an enlarged sectional view taken on the line 2—2 of Fig. 1, showing the valve in closed position.

Fig. 3 is an enlarged fragmentary view similar to Fig. 2 but showing the valve in substantially fully opened position.

Fig. 4 is a sectional view taken on the line 4—4 of Fig. 3, and

Fig. 5 is a sectional view taken on the line 5—5 of Fig. 3.

In the operation of internal combustion engines it is desirable, for the purpose of economy in operation as well as for other purposes, to dilute the normal fuel mixture supplied by the carburetor with air during certain phases of operation of the engine and in volumes also varying in accordance with the operation of the engine. Various means have heretofore been proposed for controlling the amount of air and the time of its admittance to the fuel induction system of an internal combustion engine, but as far as I am aware no adequate means have been provided for insuring an intimate mixture of the fuel mixture and the added air. It has to my knowledge been previously proposed to govern the amount of auxiliary air thus fed to the fuel induction system of an internal combustion engine by means of a centrifugally governed valve driven from the engine itself and, although in such constructions the desired amount of auxiliary air may be obtained, such constructions have been lacking in the provision of means for properly mixing such air with the fuel mixture so as to obtain a homogeneous mixture of both. One of the principal features of the present invention is the provision of a centrifugally controlled valve for governing the admission of air to the intake manifold of an internal combustion engine, but in accordance with the present invention the centrifugal governor mechanism for controlling the valve is itself placed within the manifold and the auxiliary air is fed to the zone of turbulence created by the rotation of the governor within the manifold, thereby insuring its intimate mixture with the normal fuel mixture with the normal fuel mixture flowing therethrough.

In the heretofore proposed constructions including a governor operated valve, the governor has been placed exterior to the engine and, accordingly, has presented a problem of lubrication of its parts. This disadvantage is eliminated in accordance with a further object of the present invention by drawing the air for dilution of the normal fuel mixture from the crank case of the engine whereby fuel particles carried in suspension in such air are carried into intimate contact with the governor and thereby automatically serve to continuously and properly lubricate the wearing surfaces thereof as well as lubricate the upper ends of the valves and cylinders of the engine. This latter feature has also an additional advantage in that it draws objectionable vapors including oil, moisture and acid fumes from the crank case and discharges them through the exhaust pipe for the engine, and furthermore serves to withdraw and reclaim fuel vapors from the crank case which would otherwise serve to objectionably dilute the lubricant contained therein.

Referring now to the accompanying drawing, in Fig. 1 is indicated generally at 20 an internal combustion engine having an intake manifold 22, and a carburetor 24 connected thereto by means of a casing member 26 which thus forms a part of the fuel induction system for the engine. The engine may, of course, additionally include the usual exhaust manifold 28, oil filler and crank-case breather pipe 29 communicating with the crank case of the engine, and electric generator 30 driven from the engine crankshaft as by means of a belt 31.

As indicated best in Figs. 2 and 3, the casing 26 is provided with a threaded opening 32 therein the axis of which, in the particular embodiment shown, is disposed at an angle of substantially 30% with respect to a horizontal plane, and the axial line of the opening 32 intersects the vertical axial line of the casing 26. Preferably, the casing 26 is partially spherical in shape, as indicated, in order to provide suitable clearance for the centrifugal governor mechanism which is received therein, to prevent any restriction of the inlet manifold due to the provision of the centrifugal governor mechanism, and to facilitate the proper mixture of the diluting air with the normal fuel mixture from the carburetor 24.

Threadably received within the opening 32 is a valve casing 34 in which is formed a cylinder 35. The valve casing 34 is axially adjustable in the opening 32 by reason of its threaded connection with the walls thereof and is locked in axially adjusted position by means of a set screw 36. A wall of the valve casing 34 is provided with an opening 38 therein the purpose of which is to admit air through the valve casing into the casing 26 for dilution of the fuel mixture passing therethrough. The time of admitting air through the opening 38 and the relative volume of air admitted therethrough is variably controlled by means of a sleeve valve 40 reciprocable within the cylinder 35 and cooperating with the opening 38 to control its effective area. The position of the valve 40 is controlled in the following manner.

The left hand end of the valve casing 34 as viewed in Figs. 2 and 3 is provided with a relatively small bore 42 forming a shoulder 44 at its junction with the cylinder 35. A shaft 46 is rotatably received within the bore 42 and has bearing therein. The shaft 46 projects to the right through the valve casing 34 and through the casing 26 and its extreme right hand end is provided with a suitable bearing as at 48 in the casing 26. End thrust on the shaft 46 to the right, as viewed in Figs. 2 and 3, is taken care of by means of a ball bearing 50 abutting the corresponding end of the shaft 46 and backed by a carrier 52 axially slidable in an opening 54 concentric with the bearing 48. Axial adjustment of the carrier 52 is taken care of by means of a screw 56 threaded into the casing and abutting the carrier 52 and locked in adjusted position by means of a lock nut 58.

The shaft 46 is provided with a collar 60 fixed thereto which abuts the shoulder 44 and thus limits movement of the shaft 46 to the left as viewed in the figures. Adjustment of the shaft 46 bodily in an axial direction may be accomplished by rotating the valve body 34 in the casing 26 and correspondingly adjusting the screw 56 at the opposite end of the shaft.

Slidably mounted on the shaft 46 but held against relative rotational movement with respect thereto by means of a screw such as 62 slidably received in a slot 63 formed in the surface of the shaft 46 in parallelism to the axis thereof is a member 64 having a circumferential groove 66 formed therein. As best indicated in Fig. 5, the right hand end of the sleeve valve 40 is provided with a pair of diametrically opposite, inwardly projecting lugs 68 forming a slot 70 between them. The lugs 68 are slidably received in the groove 66, their thickness being substantially equal to the width of the groove 66 so as to cause equal movement thereof with the member 64 axially of the shaft 46. It will be apparent that the grooved portion of the member 64 is movable in the slot 70 between the lugs 68 and, accordingly, the sleeve valve 40 more or less floats on the shaft 46 longitudinally of the slot 70, and this insures against possible binding of the valve 40 in operation.

A pair of links 74 are pivotally secured at one end by means of pins 72 to the member 64 within the casing 26 and to diametrically opposite sides thereof. The links 74 in turn are pivotally connected by means of pins 76 with the corresponding ends of another pair of links 78 which, in turn, are pivotally connected at their opposite ends, by means of pins 80 to diametrically opposite sides of a collar member 82 fixed upon the shaft 46 within the casing 26 by means of a set screw 84. A coil spring 86 surrounding the shaft 46 between the member 64 and the collar 82 is constantly maintained under compression between them. The pivot pins 76 connecting the adjacent ends of the links 74 and 78 are provided with enlarged extensions 90 serving as weights or centrifugal masses.

Although it will be apparent that any suitable means may be provided for driving the shaft 46 in accordance with the speed of the engine, as a means of illustration only the means shown in the drawing include a flexible cable indicated generally as at 92 of the type commonly employed in connection with speedometers of motor vehicles and including a driving socket 94 secured to one end thereof for cooperative engagement with the squared end 96 of the shaft 46 and maintained in operative relation with respect thereto by means of a nut 98 threadably engaging the left hand end of valve casing 34 as viewed in the drawing. The opposite end of the cable 92 is connected, in a similar or other suitable manner, to the driving shaft 100 of the generator 30, so as to be driven thereby in direct accordance with the speed thereof, it being understood, of course, that the speed at which the generator is rotated is directly proportional to the speed of rotation of the engine upon which it is mounted.

The various parts of the above mechanism are so adjusted and positioned that when the engine 20 is not operating, the spring 88 causes the member 64 and collar 82 to be separated to their fullest extent as governed by the links 74 and 78, and when in such position, the member 64 has been moved to the left, as viewed in the figures, a sufficient distance to move the sleeve valve 40 to a position to completely cover the opening 38. The spring 88 is initially compressed to a sufficient degree to prevent material separation of the weights 90, and consequently axial movement of the sleeve valve 40, when the engine 20 is operating at idling speed or speeds slightly thereabove. When, however, the speed of the engine is increased to the desired extent, the centrifugal force acting upon the weights 90 causes them to move outwardly and to draw the member 64 toward the collar 82 against the force of the spring 88, and the sleeve valve 40 is caused to move to the right a corresponding distance and, accordingly, will uncover a proportional area of the opening 38 upon which occurrence air will flow through that portion of the opening 38 thus uncovered, through the slot 70 in the sleeve valve 40 and into the casing 26. In view of the fact that at such period of operation, the member 62, collar 82 and links 74 and 78 as well as the weights 90 are rotating within the casing 26, they set up a zone of turbulence or disturbance within the casing 26 into which such air is introduced and which causes the air to be intimately mixed with the fuel mixture therein. As the speed of the engine increases, the speed of the shaft 46 will increase correspondingly as will the centrifugal force acting on the weights 90 and will cause them to move further apart until they may assume a position such as is indicated in Fig. 3, at which time the sleeve valve 40 has been moved to a position such as to substantially fully uncover the opening 38. At such time a maximum amount of air will be drawn through the opening 38 into the casing 26, but it will also be noted that at this point of operation, the links 74 and 78 will have moved outwardly to a position where they will create a zone of relatively increased turbulence within the casing 26 which will thereby aid in the intimate mixture of this greater volume of air with the normal fuel mixture flowing through casing 26 from the carburetor 24. Accordingly, this mechanism automatically provides a mixing means in the induction passages of the engine which varies its mixing effect in proportion to the amount of air to be mixed.

It will be apparent that the requirement in volume of auxiliary air will vary in accordance with the speed of the engine and its operating characteristics and such variations may be taken care of by so shaping the opening 38 as to obtain the desired volumes of auxiliary air required, and although the shape of the opening 38 may accordingly vary between different engines it has been shown, as a matter of illustration only, as of triangular shape and so located that one point of the triangle is first uncovered as the speed of the engine increases from idling position. Accordingly, with the opening 38 of triangular formation, it will be apparent that the volume of air admitted to the opening 38, will increase at a greater rate than it would in a case where it was of the same width throughout, this being desirable in at least some types of engines.

It will also be apparent that the operating characteristics of the valve 40 may also be varied by varying the strength of the spring 88, the amount of initial compression therein, and by varying the mass of the weights 90. The point at which the valve 40 begins to uncover the opening 38 may also be varied by changing the axial position of the collar 82 on the shaft 46 or by shifting the collar 60 on the shaft 46 with a corresponding adjustment of the screw 56. Accordingly, by the means disclosed, it will be apparent that automatically operated means are provided for feeding auxiliary air to the induction system of the engine 20 in accordance with variations in the conditions of operation of the engine and causing intimate mixture of such auxiliary air with the normal fuel mixture passing through the carburetor. Also that by suitable adjustment of the mechanism indicated, a material increase to the economy of operation of the engine may be effected, particularly under certain conditions.

In the description thus far given, it has been assumed that the air drawn into the opening 38 to dilute the normal fuel mixture in the fuel induction system of the engine, may be the usual air surrounding such engine in operation. However, in accordance with a further object of the present invention, means are preferably provided whereby such auxiliary air is drawn from the crank case of the engine. This is particularly desirable, not only due to the fact that it eliminates the visible escape of vapors from the crank case of the engine and serves to draw off and discharge moisture and acid vapors as well as fuel vapors which would tend to dilute the lubricant in the crank case but also, in drawing off the oil vapors, it serves to automatically lubricate the moving parts of the device.

In order to connect the opening 38 with the interior of the crank case of the engine 20, a hollow body or casing member 92 is mounted on the projecting end of the valve casing member 34 so as to form an annular air passage 94 thereabout. The right hand end of the body member 92, as viewed in the drawing, is internally threaded for cooperative engagement with the threaded exterior of the valve body 34 so as to permit it to be sealed against the corresponding face of the casing 26 through the medium of a gasket such as 97. The opposite end of the body member 92 is formed to fit the corresponding smooth cylindrical end surface of the valve casing 34 to effect a substantial seal at this point. An outwardly projecting externally threaded hollow boss 98 on the body member 92 cooperates with a nut 100 to secure a tube 102 thereto. Although it is obvious that the opposite end of the tube 102 may be connected into the crank case of the engine at any suitable location so as to enable it to transmit the air and vapors therefrom to the intake manifold 22, as a matter of illustration, it is shown as being connected into the breather pipe 29 so as to take advantage of the usual splash plates (not shown) provided within such breather pipes and thus prevent the direct admission of large particles of lubricating oil to the pipe 102.

As will be apparent with this construction, not only are undesirable vapors drawn from the crank case of the engine, the tendency for the dilution of the lubricant in the crank case lessened and the visible escape of vapors from the crank case substantially eliminated, but sufficient oil vapor and particles of oil in suspension is passed through the valve mechanism to provide ample lubrication for the parts thereof continuously and automatically during operation.

Formal changes may be made in the specific embodiment of the invention described, without departing from the spirit or substance of the broad invention, the scope of which is commensurate with the appended claims.

What I claim is:

1. In combination with an internal combustion engine having a fuel induction passage and a crank case, a duct connecting said crank case and said passage, valvular means controlling the flow of fluid through said duct, and mechanically driven means in said passage controlling the operation of said valvular means, said mechanically driven means being positioned in the path of fluid flowing from said duct into said passage.

2. A unitary auxiliary air device for the manifold of an internal combustion engine comprising, in combination, a casing securable to said manifold, a valve in said casing for controlling the flow of air therethrough, a centrifugally operated governor mechanism carried by said casing and cooperating with said valve to control the position thereof in said casing, and means drivingly connecting said mechanism with a rotating part of said engine, said casing, valve and governor mechanism being applicable to and removable from said manifold as a unit without disconnecting said driving connection.

3. In combination with an internal combustion engine having a fuel induction passage, a valve casing communicating with said passage, said valve casing having an opening therein, a valve member in said valve casing movable to control the effective area of said opening, a rotatable shaft projecting through said valve casing and through said valve into said passage, centrifugal governor mechanism mounted on said shaft within said passage, means connecting said mechanism with said valve, and means for driving said shaft from said engine.

4. In combination with an internal combustion engine having an induction passage and a crank case, said induction passage having an opening in a wall thereof, a valve controlling the flow of fluid through said opening, centrifugally operated means within said passage for governing said valve, means including a shaft connected for rotation in accordance with the speed of rotation of the engine for driving said centrifugally operated means, and a duct connecting the interior of said crank case and said opening whereby to feed oil laden vapors from said crank case to said passage, and said shaft being positioned in the path of flow of said vapors whereby to receive lubrication therefrom.

DOUGALD H. MUNRO.